United States Patent
Daly

[11] Patent Number: 6,024,570
[45] Date of Patent: Feb. 15, 2000

[54] ARTIFICIAL HORIZON TRAINING AID

[76] Inventor: Francis L. Daly, 166 Skiff Ave., Vineyard Haven, Mass. 02568

[21] Appl. No.: 09/111,699

[22] Filed: Jul. 8, 1998

[51] Int. Cl.[7] .................................................. G09B 9/08
[52] U.S. Cl. ................................................ 434/38; 434/29
[58] Field of Search ...................... 434/29, 35, 38, 434/51

[56] References Cited

U.S. PATENT DOCUMENTS

| | | | |
|---|---|---|---|
| 2,395,838 | 3/1946 | Beishline | 434/51 |
| 2,454,693 | 11/1948 | Foster | 434/51 X |
| 2,458,982 | 1/1949 | Dehmel | 434/51 |
| 2,460,675 | 2/1949 | Bourgaize | 434/51 |
| 2,470,143 | 5/1949 | Christie | 434/38 |
| 2,516,677 | 7/1950 | Christie | 434/38 |
| 3,800,467 | 4/1974 | Brnner | 434/35 X |
| 5,490,783 | 2/1996 | Stephens et al. | 434/35 |

*Primary Examiner*—Sam Rimell
*Attorney, Agent, or Firm*—Terrance L. Siemens

[57] ABSTRACT

A training aid providing a display simulating that of an artificial horizon instrument. The training aid comprises a base, a circular member rotatably supported within the base, and a horizon indicating member. The circular member is transparent and has an image representative of an aircraft and a pointer inscribed on the circular member. The horizon indicating member has a symbolic horizon inscribed thereon, and is visible through the circular member. The base has index marks forming a scale visible through the circular member. The horizon indicating member is linearly movable relative to the base, and may be manipulated so that the symbolic horizon is visible in positions indicative of climbing, diving, and level flight. The circular member may be rotated to indicate banking to the right and left and straight flight. The circular member and horizon indicating member are independently manipulable so that any flight attitude attainable in actual flight can be symbolically reproduced on the training aid.

7 Claims, 4 Drawing Sheets

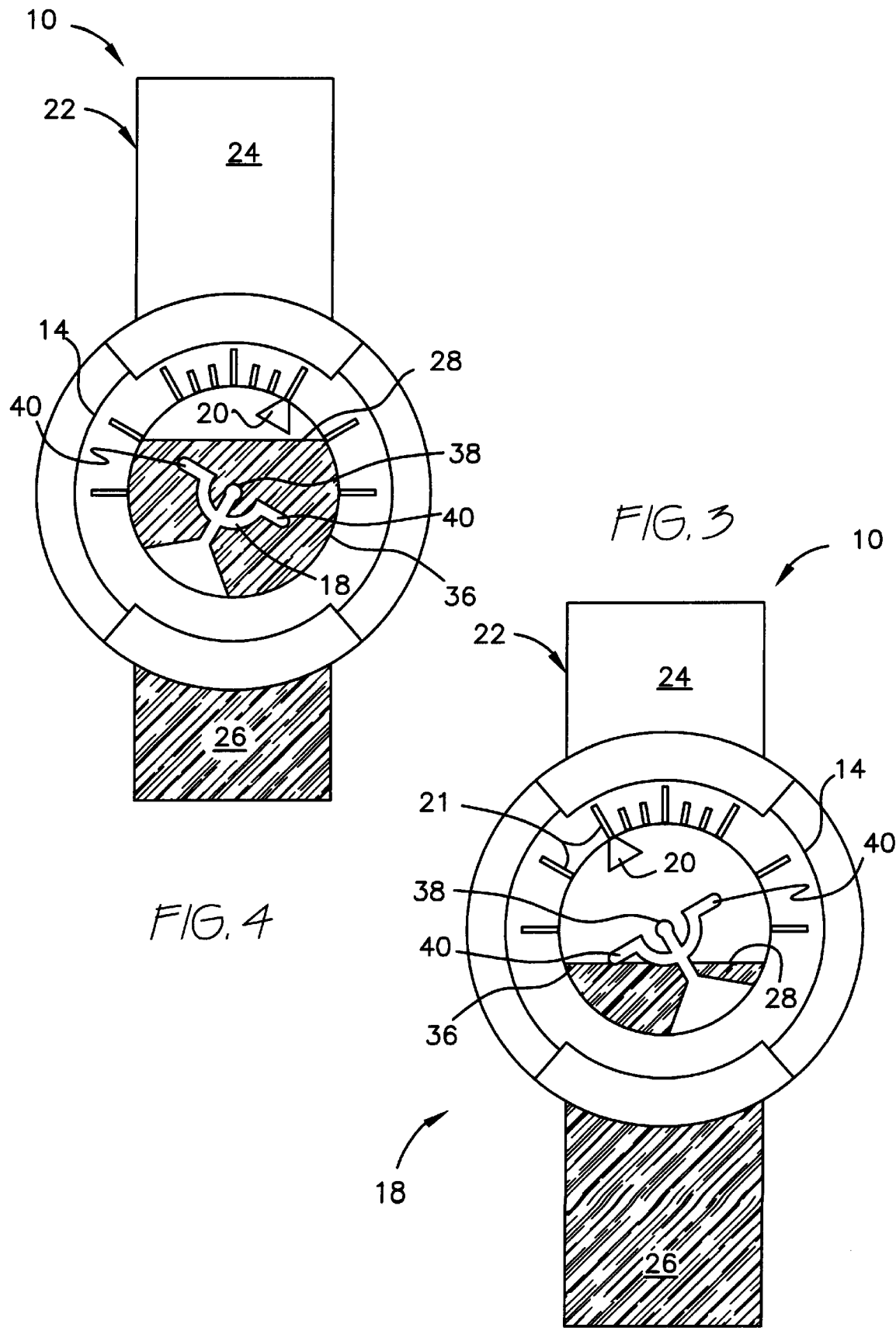

ARTIFICIAL HORIZON TRAINING AID

BACKGROUND OF THE INVENTION

1. Field of the Invention

The present invention relates to training aids for familiarizing student pilots with use of an artificial horizon display. More particularly, the invention comprises apparatus which may be manipulated to simulate the display of an artificial horizon under varying simulated conditions of aircraft attitude.

2. Description of the Prior Art

Under conditions of actual flight, it frequently occurs that a pilot will lose sight of the actual or natural horizon. This is a potentially hazardous condition, since a pilot can become disoriented and not be able to recognize the attitude of the aircraft by his or her own senses. To overcome this potential problem, instruments known as artificial horizons or gyro horizons are provided in actual aircraft to provide a display simulating the actual or natural horizon.

Familiarity with this instrument, in the sense of being able to assimilate the information it gives at a glance is critical to successful operation of an aircraft. It is not necessary to duplicate an actual artificial horizon to provide a simulation of the display of the actual instrument. Graphical representation of the display suffices to conduct exercises in recognizing and reading the display of the actual instrument. U.S. Pat. No. 2,395,838, issued to Allen W. Beishline on Mar. 5, 1946, illustrates a training device simulating the display of an actual artificial horizon instrument. The device of Beishline is built up from several overlying pieces of cardboard or the like. The outermost member is circular and has a generally circular window formed at its center. All remaining components are retained within the periphery of the outermost member. Several components are joined by a rivet or grommet at the center of the outermost member to accommodate rotation. The window reveals a linearly slidable member inscribed with a line representing the horizon.

The present invention differs from the device of Beishline in that it entraps one circular member within a base, thereby eliminating necessity for the grommet of Beishline. The circular member is transparent, apart from indicia borne thereon, thereby revealing additional indicia therebelow, thereby eliminating necessity for the window of Beishline. A linearly slidable member including a line representing the horizon extends beyond the base, unlike the more complex corresponding components of Beishline's device. A pointer provided by a folded tab in Beishline is superseded in the present invention by indicia disposed upon the transparent circular member in the present invention. Function provided by many component parts in Beishline is duplicated with a total of three parts in the present invention. Therefore, this prior art patent is not seen to describe the instant invention as claimed.

SUMMARY OF THE INVENTION

The present invention comprises a hand held device which simulates the display of an artificial horizon. The device includes one stationary part, hereinafter termed a base, and two parts movable relative to the stationary part. Each movable part simulates one variable condition of the attitude of an aircraft in flight.

One movable part is a circular, transparent member inscribed with indicia simulating that portion of an actual artificial horizon instrument representing the aircraft and a pointer. The base is inscribed with index marks representative of a scale which would appear on an actual artificial horizon instrument. The base has a circular window which reveals the second movable part. The second movable part is divided into two sections bearing respectively light and dark background fields. The light field represents sky and the dark field represents ground. The line of demarcation separating the light and dark fields is the artificial horizon. The member bearing the artificial horizon is linearly movable in the base in directions aligned with the center of the scale inscribed on the base.

The circular member rotates within the base, thereby causing the aircraft symbol to indicate banking. The member bearing the artificial horizon can be raised and lowered in the base, thereby simulating the effect of diving and climbing by an aircraft. Either movable part may be moved, or both may be moved simultaneously.

The novel training aid is formed from any suitable rigid constituent material, such as synthetic resins, which are readily and inexpensively formed by molding. The component parts of the aid are fabricated from sheets of the selected constituent material which may be of any suitable thickness. It is preferred that the thickness of individual component parts of the training aid be greater than one sixteenth of an inch and less than one quarter inch. This range of thicknesses imparts an impression of substance and solidity compared to paper and paperboard stock materials, and is readily grasped by the fingers, thereby enabling easy manipulation and movement of the movable parts.

The novel training aid is employed to familiarize novice pilots with the artificial horizon instrument. The movable parts are moved to various positions, and the novice pilot attempts to recognize actual attitude conditions indicated by the combination of displayed conditions. The purpose of the device is to enable novice pilots to interpret and assimilate information given by an actual artificial horizon instrument instantaneously. This ability eliminates practice in actual aircraft or practice employing actual artificial horizon instruments. Therefore, one phase of pilot training can be accomplished with minimal expenditure of time and without requiring expensive or complicated equipment.

Accordingly, it is a principal object of the invention to provide a training aid which simulates the display of an artificial horizon instrument.

It is another object of the invention to enable manual manipulation of the training aid to vary conditions displayed thereby.

It is a further object of the invention to minimize the number of component parts of the training aid.

Still another object of the invention is to employ movable parts of greater than nominal thickness, to assist in grasping and maneuvering the movable parts.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 3 is a top plan view of the invention showing adjustment of movable parts to simulate a particular condition of aircraft attitude.

FIG. 4 is similar to FIG. 3, but shows a different condition of aircraft attitude.

DETAILED DESCRIPTION OF THE PREFERRED EMBODIMENTS

Figure 1:
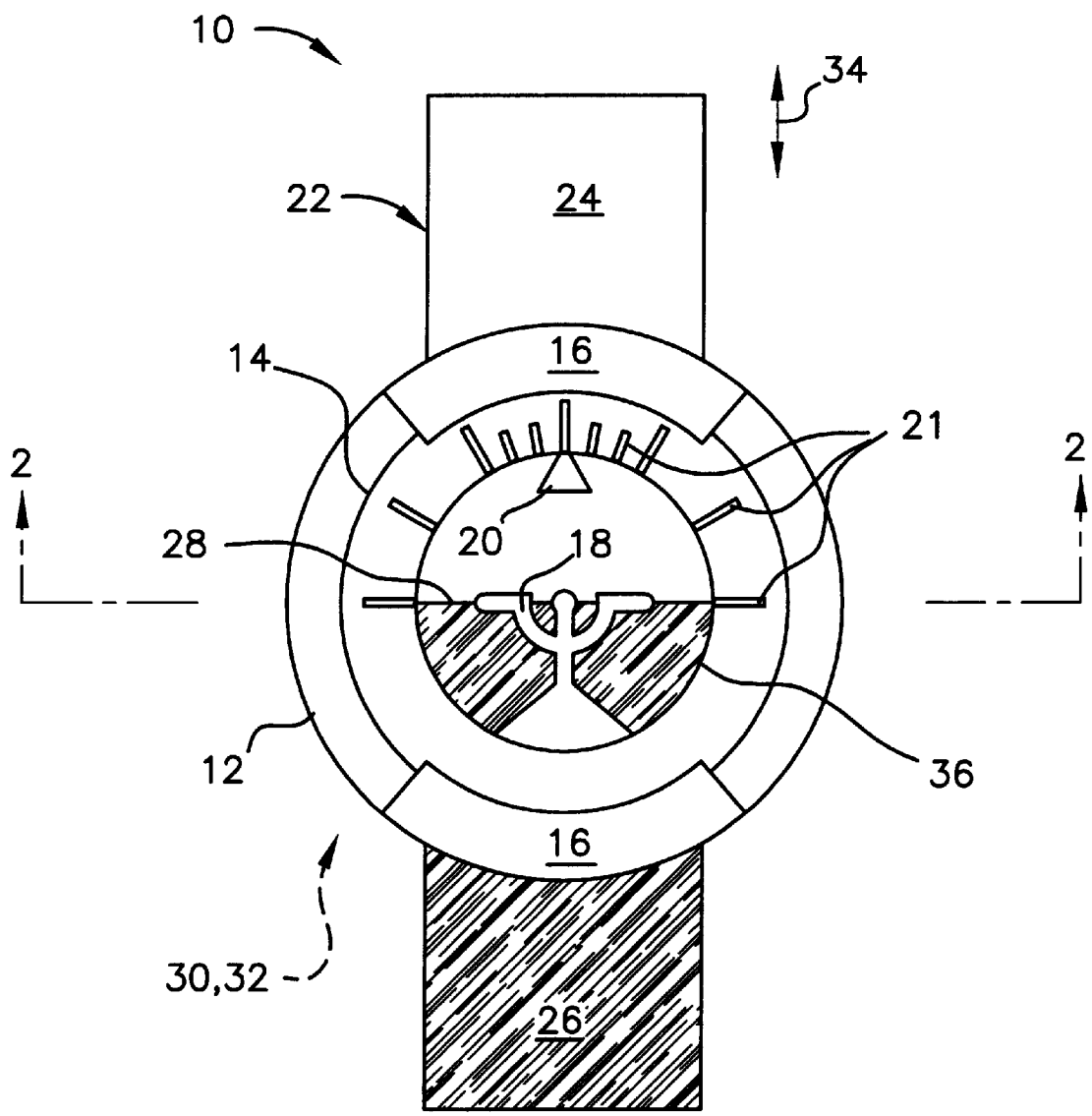
FIG. 1 is a top plan view of the invention.

Turning now to FIG. 1 of the drawings, training aid 10 comprises a circular base 12 to which two movable parts are mounted. One movable part is a transparent circular member 14. Member 14 is secured in place above the circular section of base 12 by lateral walls 16 of base 12. Walls 16 are dimensioned and configured to partially surround and entrap member 14, and to constrain member 14 to move only in rotation relative to base 12. Member 14 has indicia providing a symbolic depiction 18 of an aircraft formed thereon. Depiction 18 may be painted onto or engraved into member 14, may be a decal adhered thereto, or may be formed in any other suitable way. Depiction 18 preferably simulates indicia traditionally provided on an actual artificial horizon instrument (not shown). Indicia inscribed on member 14 includes a pointer 20 located above depiction 18. Pointer 20 may be utilized in conjunction with index marks 21 collectively forming a scale visible below member 14.

The second movable part mounted to base 12 is a horizon indicating member 22. Member 22 is a broad strip divided into two zones or fields. Field 24 is defined by a light colored surface, and field 26 is defined or characterized by a dark colored surface. Fields 24, 26 are so configured that a straight line of demarcation 28 is located at the joint existing between fields 24, 26. Line of demarcation 28 provides a symbolic depiction of a horizon carried on horizon indicating member 22.

Figure 2:
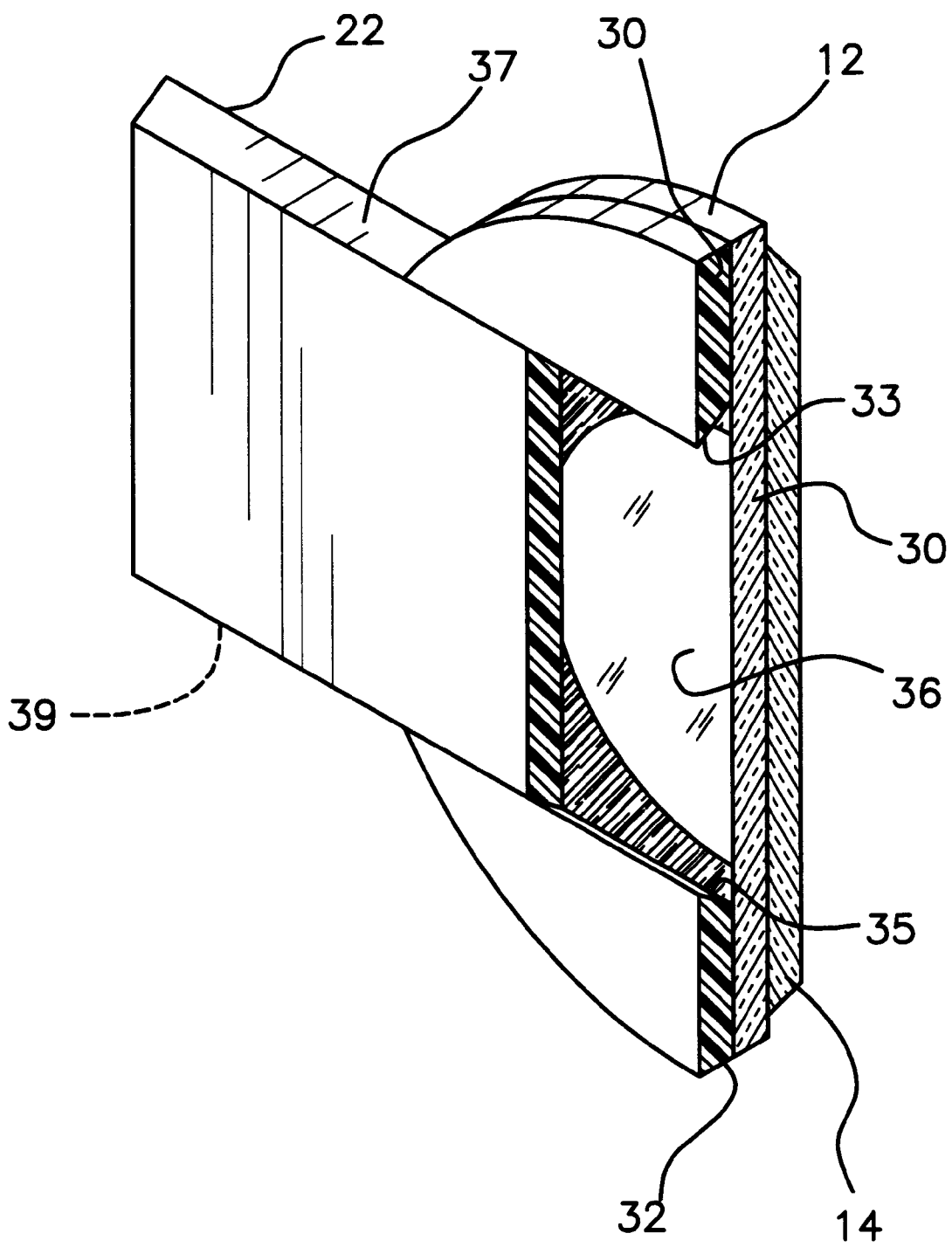
FIG. 2 is sectional view of the invention taken along line 2—2 of FIG. 1, shown in perspective.
Figure 5:
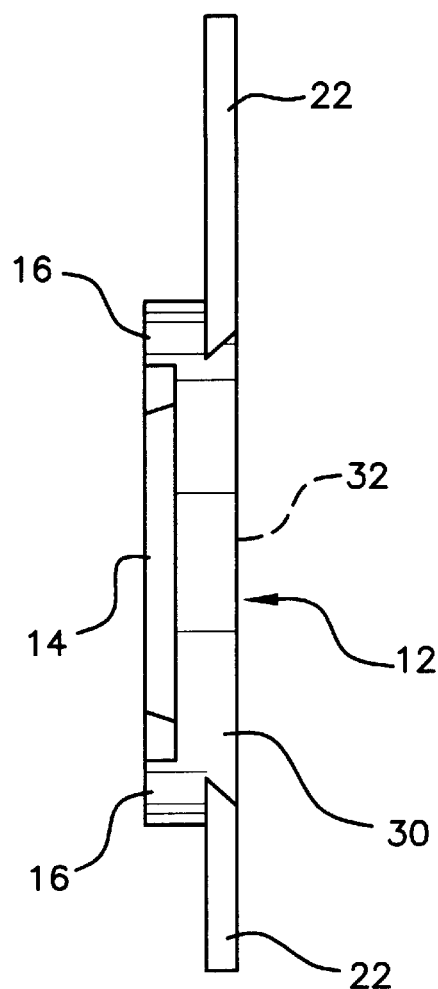
FIG. 5 is a side elevational view of the invention.
Figure 6:
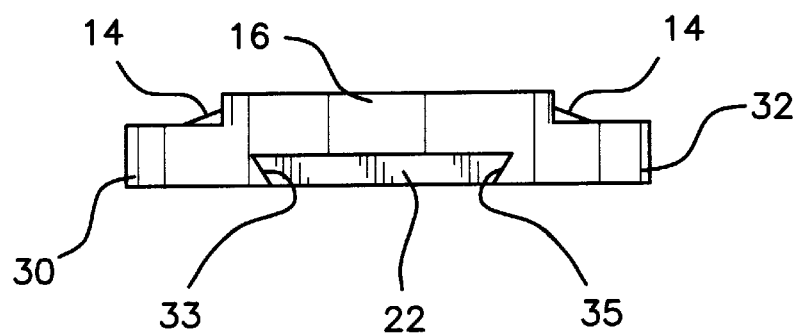
FIG. 6 is an end elevational view of the invention.

Horizon indicating member 22 is slidably entrapped by lateral walls 30, 32 (see FIG. 2) of base 12. Walls 30, 32 partially surround member 22, and are dimensioned and configured to constrain member 22 to move only linearly relative to base 12 in a direction indicated by arrow 34. Walls 30, 32 are beveled at 33, 35 to cooperate with corresponding beveling 37, 39 of member 22. Member 22 is secured below member 14, and is visible below member 14, revealed to view through a circular window 36 formed in base 12. Window 36 may comprise a circular opening, or may be formed from a circular panel of transparent material. FIGS. 5 and 6 offer additional views of aid 10 showing entrapment of members 14 and 22.

To summarize the nature of the moving parts of training aid 10, member 14 is a disc which rotates about its center, but otherwise does not move relative to base 12, whereas horizon indicating member 22 moves in a linear path relative to base 12. Member 22 and the artificial horizon provided by line of demarcation 28 are visible below member 14 since the latter is mostly transparent, apart from opacity of indicia forming depiction 18 and pointer 20, and because of window 36 formed in base 12. Member 14 and window 36 are circular since this configuration is compatible with rotation, rotation of a circular object generates no distracting motion apart from discernible features of the disc, such as indicia, and to better simulate actual artificial horizon instruments.

The scale formed by index marks 21 is disposed around half of window 36, and is located immediately adjacent to the edge of window 36, also to better simulate actual instruments.

FIGS. 3 and 4 illustrate how the movable parts of training aid 10 simulate the display of an artificial horizon instrument under differing conditions of aircraft attitude. In FIG. 3, rotatable member 14 has been rotated so that pointer 20 has moved slightly to the left, compared to its position in FIG. 1. Horizon simulating member 22 has been drawn downwardly in the depiction of FIG. 3, so that line of demarcation 28 now passes through depiction 18. An enlarged member 38 is arranged to maintain a position at the center of rotation, and represents aircraft position relative to the artificial horizon. It will be seen by examining FIG. 3 that enlarged indicia member 38 now lies above line of demarcation 28. This signifies in actual instruments that the aircraft is climbing. Inclination of wings 40 of depiction 18, which coincides with orientation of pointer 20 relative to the scale formed by index marks 21, indicates that the aircraft is banking to the left. The combination of climbing and banking is one possible combination of various attitude characteristics with which the user must become familiar in order to master an actual artificial horizon instrument.

In FIG. 4, both inclination of wings 40 and relative position of line of demarcation 28 have been adjusted to new positions. In FIG. 4, the aircraft represented by the display of training aid 10 is banking to the right and is diving. Still other attitude characteristics may be displayed by training aid 10 by appropriate rotation of member 14 and sliding movement of horizon indicating member 22. A person being trained to utilize an actual artificial horizon instrument practices with training aid 10 by moving members 14 and 22 and attempting to tell at a glance the attitude characteristics represented thereby. When comprehension of information displayed is instantaneous, the student will be able to graduate to an actual artificial horizon instrument without requiring acclimation to the latter.

It is to be understood that the present invention is not limited to the embodiments described above, but encompasses any and all embodiments within the scope of the following claims.

I claim:

1. A training aid simulating the display of an artificial horizon instrument, comprising:

a base having a window formed therein;

a rotatable member having a symbolic depiction of an aircraft formed thereon; and a horizon indicating member having a symbolic depiction of a horizon formed thereon, said horizon indicating member disposed to be visible below said rotatable member and to be visible within said base through said window, said base having first lateral walls partially surrounding said rotatable member, said lateral walls dimensioned and configured to constrain said rotatable member to move only in rotation relative to said base.

2. The training aid according to claim 1, wherein said rotatable member comprises a disc which is mostly transparent, and said symbolic depiction of the aircraft is opaque.

3. The training aid according to claim 1, wherein said rotatable member has a pointer located above said symbolic depiction of the aircraft, and said base has index marks forming a scale visible below said rotatable member.

4. The training aid according to claim 1, wherein said base has second lateral walls partially surrounding said horizon indicating member, said second lateral walls dimensioned and configured to constrain said horizon indicating member to move only linearly relative to said base.

5. The training aid according to claim 1, wherein said horizon indicating member has a first field defined by a light colored surface, a second field defined by a dark colored surface, and a straight line of demarcation located at the joint of and demarcating said first field and said second field, said symbolic depiction of a horizon comprising said line of demarcation.

6. The training aid according to claim 1, wherein
   said rotatable member is circular;
   said window of said base is circular; and
   said scale is disposed around half of and is located immediately adjacent to said window of said base.

7. A training aid simulating the display of an artificial horizon instrument, comprising:
   a circular base having a circular window formed therein;
   a circular, mostly transparent rotatable disc having an opaque symbolic depiction of an aircraft and a pointer formed thereon; and
   a horizon indicating member having indicia comprising a symbolic depiction of a horizon formed thereon, said horizon indicating member disposed to be visible below said rotatable disc and to be visible within said base, wherein said horizon indicating member has a first field defined by a light colored surface, a second field defined by a dark colored surface, and a straight line of demarcation located at the joint of and demarcating said first field and said second field, said symbolic depiction of a horizon comprising said line of demarcation, said base having
      first lateral walls partially surrounding said rotatable disc, index marks forming a scale visible below said rotatable disc, wherein said scale is disposed around half of and is located immediately adjacent to said window of said base, and wherein said lateral walls are dimensioned and configured to constrain said rotatable disc to move only in rotation relative to said base, and
      second lateral walls partially surrounding said horizon indicating member, said second lateral walls dimensioned and configured to constrain said horizon indicating member to move only linearly relative to said base.

* * * * *